(12) United States Patent
Mindermann

(10) Patent No.: US 6,168,419 B1
(45) Date of Patent: Jan. 2, 2001

(54) FLAME MONITOR

(75) Inventor: Kurt-Henry Mindermann, Ratingen (DE)

(73) Assignee: Giersch GmbH, Hemer (DE)

( * ) Notice: Under 35 U.S.C. 154(b), the term of this patent shall be extended for 0 days.

(21) Appl. No.: 09/262,733

(22) Filed: Mar. 4, 1999

(30) Foreign Application Priority Data

Mar. 6, 1998 (DE) .............................................. 198 09 653

(51) Int. Cl.[7] ...................................................... F23N 5/08
(52) U.S. Cl. ............................................. 431/79; 340/578
(58) Field of Search ............................ 431/79; 340/578; 250/554

(56) References Cited

U.S. PATENT DOCUMENTS

| | | | |
|---|---|---|---|
| 3,301,308 | * 1/1967 | Briggs | 431/79 |
| 3,304,989 | * 2/1967 | Alexander et al. | 431/79 |
| 3,748,083 | * 7/1973 | Finger | 431/79 |
| 5,480,298 | * 1/1996 | Brown | 431/79 |

FOREIGN PATENT DOCUMENTS

| | | |
|---|---|---|
| 3108 409 C3 | 9/1982 | (DE). |
| 4-64806 | * 2/1992 | (JP) ..................................... 431/79 |

\* cited by examiner

Primary Examiner—Ira S. Lazarus
Assistant Examiner—Sara Clarke
(74) Attorney, Agent, or Firm—Alix, Yale & Ristas, LLP

(57) ABSTRACT

The invention relates to a flame monitor for blue-burning flames having a photosensor whose output signal is evaluated in such a manner that the fuel supply is switched off not only when the flame is extinguished but also when its color moves too far into the yellow band.

13 Claims, 3 Drawing Sheets

FLAME MONITOR

FIELD OF THE INVENTION

The invention relates to a flame monitor for blue-burning flames of gas or oil burners, which is intended not only to confirm the presence of the flame but also to monitor the combustion process.

DESCRIPTION OF RELATED ART

For safety reasons, a flame monitor should operate not only in the visible light band, but also in a spectral band beyond visible light. It is therefore known for sensors to be chosen for this purpose which supply a signal which is sufficiently above the noise level in the near-ultraviolet band. The signal supplied from the sensor is evaluated in an evaluation circuit which is designed such that the fuel supply is inhibited if the flame signal remains below 500 nm.

A flame which burns in the blue band in normal operation has a correctly set fuel/air ratio, in which optimum combustion is ensured, with essentially stoichiometric combustion and low CO emissions. If this ratio is disturbed, the color of the flame moves toward longer wavelengths, that is to say into the green-yellow-red band of the spectrum. At the same time, the output signal from the photosensor also increases and indicates a stable burner operation even though, in reality, a disturbance exists in that the flame is no longer burning optimally, and is thus no longer blue.

German Patent 3,108,409 has disclosed a flame monitor which uses a UV tube and a photosensor as sensors for flame monitoring, whose signals are each supplied via a frequency/voltage converter having a maximum selection circuit, with only the respectively larger signal being used for measurement and evaluation purposes. This means that it is not possible to tell whether the burner is operating in a stable manner, with a blue flame.

SUMMARY OF THE INVENTION

The object of the invention is to provide a flame monitor which makes it possible to tell whether the burner is operating in a stable manner with a blue flame.

The invention thus provides a flame monitor having a photosensor, which detects the flame radiation and whose sensitivity rises sharply from ultraviolet to infrared, and an evaluation circuit which is connected downstream of the photosensor and switches off the fuel supply when (i) there is radiation in the band from 200 to 500 nm or (ii) the increase in the detected radiation intensity above 500 nm indicates movement out of the blue band. Photosensors of the said type are available, for example, as silicon photodiodes under the designation SFH 191 from Siemens, Munich, as well as from other Companies which produce semiconductor components.

The evaluation circuit may comprise, in particular, a first channel for signal components at a relatively high frequency, which represent signal components from ultraviolet radiation up to 500 nm, and a second channel for signal components at a relatively low frequency, which represent visible and infrared radiation, in which case the output signal from the first channel, which enables the fuel supply, can be inhibited by an output signal, whose magnitude can be predetermined, on the second channel.

Other refinements of the invention can be found in the following description and the dependent claims.

The invention is explained in more detail in the following text, with reference to an exemplary embodiment which is illustrated in the attached figures.

DESCRIPTION OF THE PREFERRED EMBODIMENT

Figure 1:
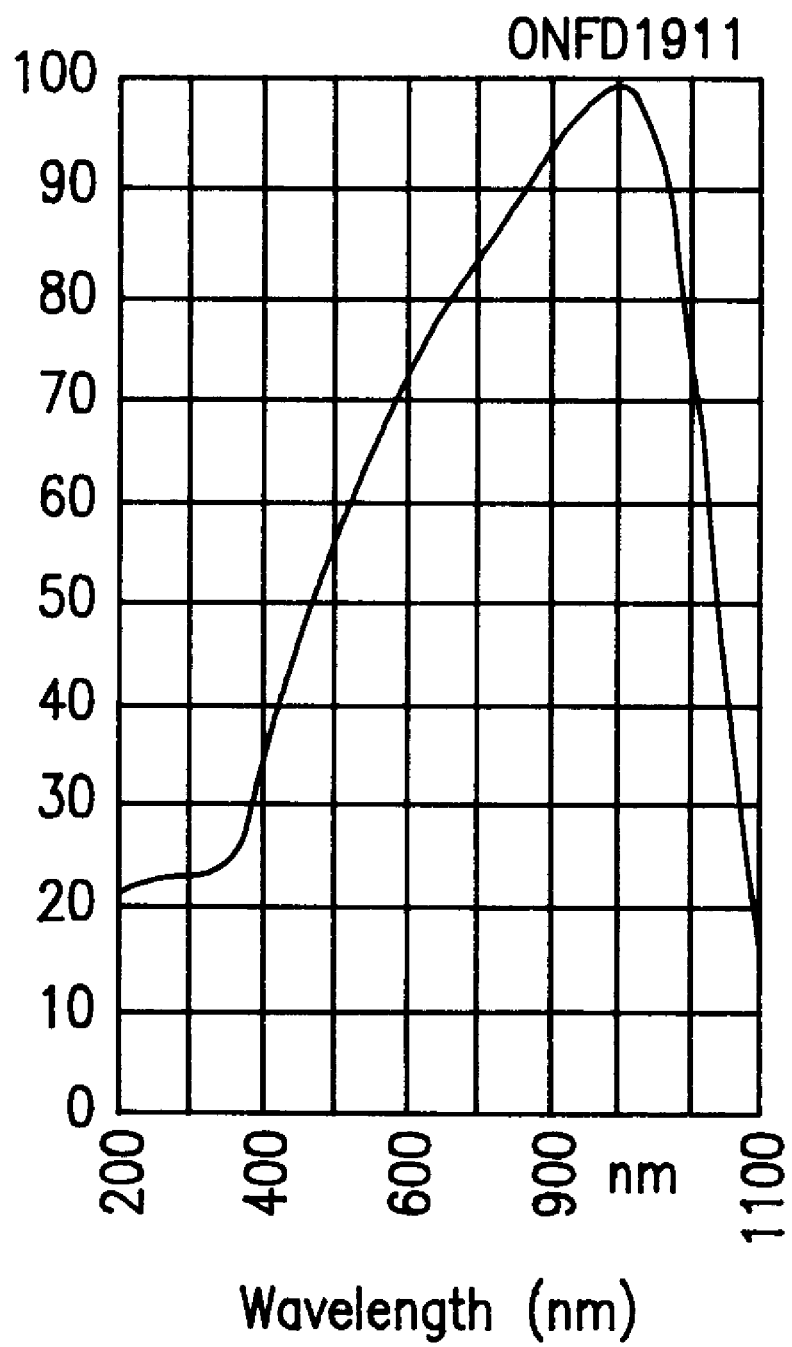
FIG. 1 shows the relative spectral sensitivity of a photosensor for a flame monitor as claimed in the invention.

Photodiodes having a spectral sensitivity as shown in FIG. 1 are commercially available; these are silicon diodes, whose sensitivity in the ultraviolet band has been enhanced by known measures.

Figure 2A:
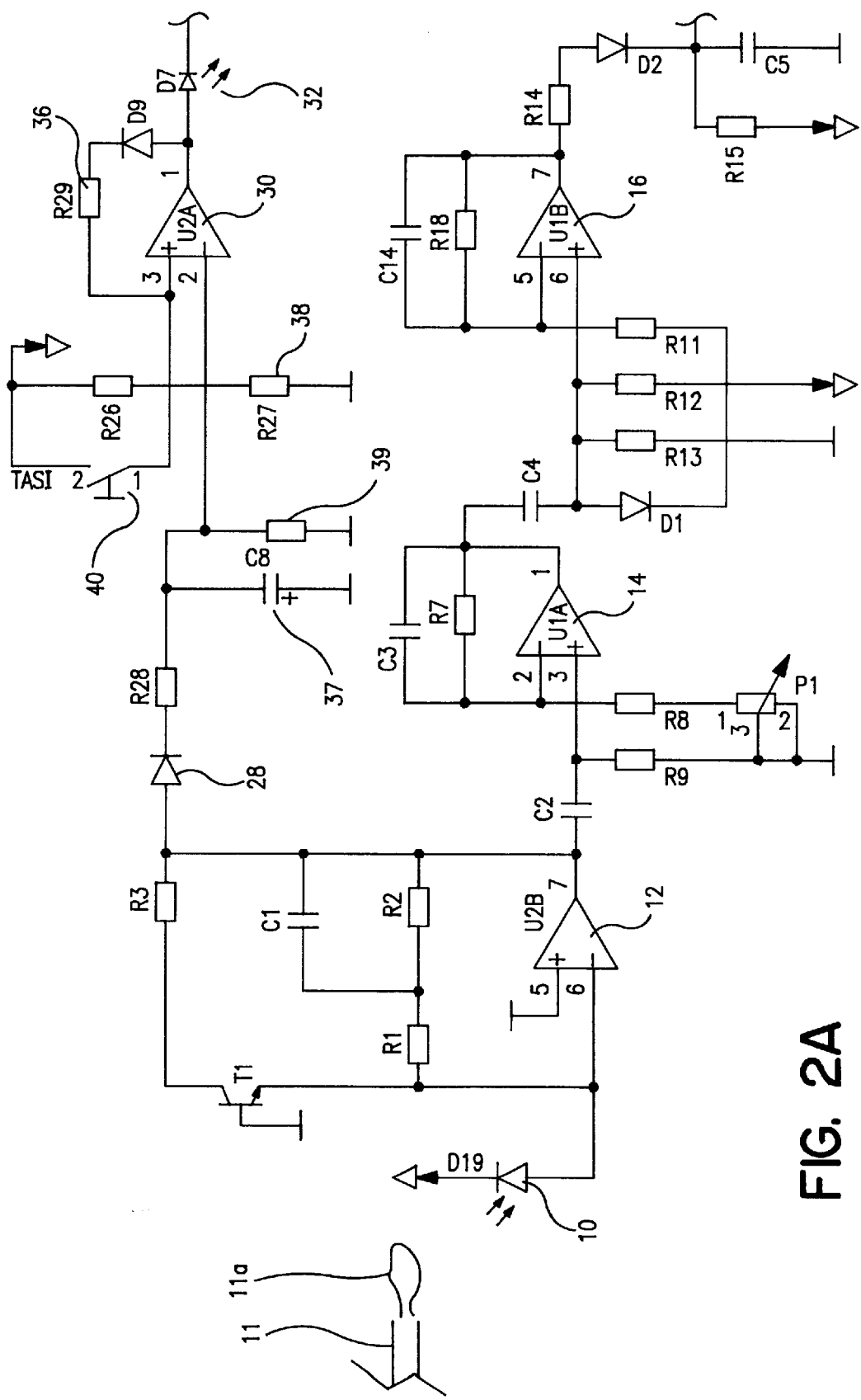
FIG. 2 shows an embodiment of an evaluation circuit for a flame monitor and a diagrammatical representation of a burner and fuel control as claimed in the invention.
Figure 2B:
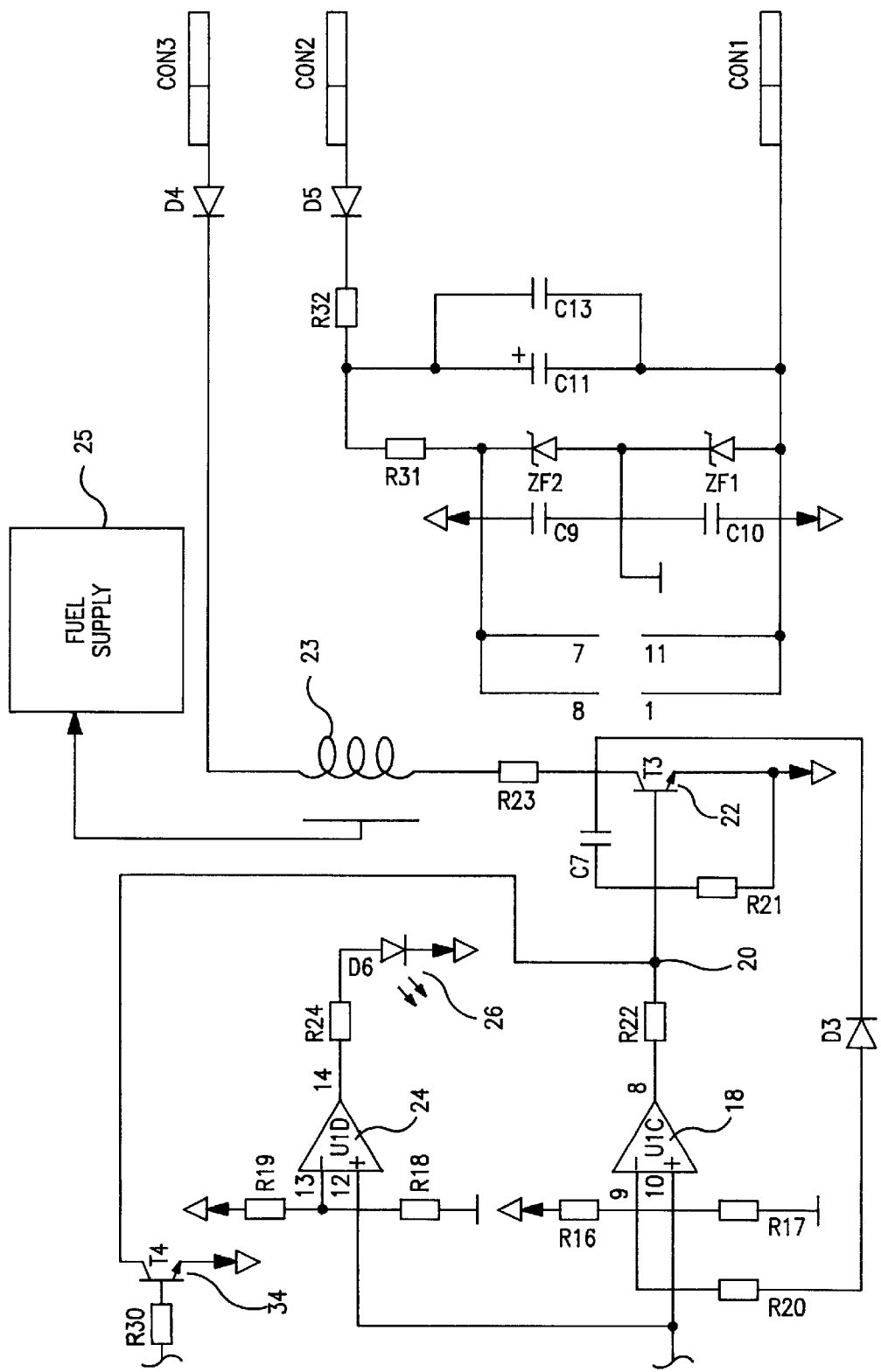

According to FIG. 2, such a photodiode 10, for monitoring a flame 11a from a burner 11, is located at the input of a preamplifier 12 in the form of an operational amplifier. Its output produces either a relatively low voltage with a relatively high flicker frequency which is characteristic of a blue-burning flame, or a high voltage with a relatively low flicker frequency, which is characteristic of a flame which has moved out of the blue spectral band. The signal supplied by this voltage is amplified in a first channel via operational amplifiers 14, 16 and 18, and the amplified output signal is applied to a node 20, which is connected to a base connector of a transistor 22. The collector circuit of the transistor 22 includes a winding 23 of a relay, which enables a fuel supply 25 when the relay is energized. Overdriving is avoided by a suitable circuitry for the operational amplifiers 14, 16, 18.

A light emitting diode 26 is driven via a further operational amplifier 24 and indicates that the described first channel for signal components at a relatively high frequency, which represent signal components from ultraviolet radiation up to 500 nm, is operating.

In known flame monitors a relay which enables the fuel supply would remain pulled in, even if the flame is burning outside the blue band. However, according to the invention, the fuel supply is intended to be switched off not only when the flame is extinguished but also when it moves too far out of the blue band.

This is achieved by the output signal of the preamplifier 12 being passed via a rectifier 28 to a second channel for signal components at a relatively low frequency, which represent visible and infrared radiation. Owing to the high spectral sensitivity of the sensor 10, this rectified signal increases in magnitude the "yellower" the flame is. After smoothing of the DC voltage, it is passed to an operational amplifier 30 which, via a light emitting diode 32, drives a transistor 34 whose collector is connected to the node 20, while its emitter is connected to the negative supply voltage of, for example, −15 V. When the transistor 34 is switched on, the node 20 is likewise reduced to the negative supply voltage and the transistor 22 is switched off, as a result of which the relay also trips. That DC voltage at the input of the operational amplifier 30 at which the relay is intended to trip can be defined by dimensioning the voltage divider formed by the resistors 36 and 38. A timer, formed by a capacitor 37 and a resistor 39, produces a delay of (for example) one minute, since, when a burner is started from cold, its flame initially always burns yellow.

When the flame has been extinguished owing to lack of fuel, a maintenance technician is in general called. He or she can then override the DC voltage channel by pressing the button 40, and reignite the burner, with the diode 32 signalling to him or her that a fault is present which has caused the flame color to become more yellow. The technician can then, for example, reset the fuel/air ratio to the desired value.

Although the foregoing has been a description of the preferred embodiment of the invention, it will be apparent to those skilled in the art that numerous variations and modifications may be made to the invention without departing from the scope as described herein.

What is claimed, is:

1. A flame monitor for a flame of a burner having a fuel supply thereto, comprising:
   a photosensor which detects radiation from a flame and whose sensitivity rises sharply from ultraviolet to infrared;
   an evaluation circuit which is connected downstream of the photosensor for switching off a fuel supply when (i) there is radiation in the band from 200 to 500 nm or (ii) the increase in the detected radiation intensity above 500 nm indicates movement out of the blue band; and
   a timer which delays the response to flame radiation in the relatively low frequency band for a predetermined time after ignition of the flame.

2. A flame monitor for a flame of a burner having a fuel supply thereto, comprising:
   a photosensor which detects radiation from a flame and whose sensitivity rises sharply from ultraviolet to infrared; and
   an evaluation circuit which is connected downstream of the photosensor for switching off a fuel supply when (i) there is radiation in the band from 200 to 500 nm or (ii) the increase in the detected radiation intensity above 500 nm indicates movement out of the blue band;
   wherein, the evaluation circuit comprises a first channel for signal components at a relatively high frequency, which represent signal components from ultraviolet radiation up to 500 nm, and a second channel for signal components at a relatively low frequency, which represent visible and infrared radiation, in which case the output signal from the first channel, which enables the fuel supply, can be inhibited by an output signal, whose magnitude can be predetermined, on the second channel.

3. The flame monitor as claimed in claim 2, having a common preamplifier for both channels.

4. The flame monitor as claimed in claim 3, having a signal transmitter which uses the output signal from the second channel to indicate an interruption in the fuel supply.

5. The flame monitor as claimed in claim 2 having a signal transmitter which uses the output signal from the second channel to indicate an interruption in the fuel supply.

6. The flame monitor as claimed in claim 2, having a timer which delays response to flame radiation in the relatively low frequency band for a predetermined time after ignition of the flame.

7. A burner system having a flame monitor for monitoring a flame comprising:
   a burner having a fuel supply connected thereto;
   a photosensor which detects radiation from the flame of the burner and whose sensitivity rises sharply from ultraviolet to infrared;
   an evaluation circuit which is connected downstream of the photosensor for switching off the fuel supply when (i) there is radiation in the band from 200 to 500 nm or (ii) the increase in the detected radiation intensity above 500 nm indicates movement out of the blue band; and
   a timer which delays the response to flame radiation in the relatively low frequency band for a predetermined time after ignition of the flame.

8. A flame monitor for a flame of a burner having a fuel supply thereto, comprising:
   a photosensor which detects radiation from a flame and whose sensitivity to wavelength increases from ultraviolet to infrared;
   an evaluation circuit which is connected to receive input from the photosensor for switching off a fuel supply when (i) there is radiation in the band from 200 to 500 nm or (ii) there is an increase in the detected radiation intensity above 500 nm which indicates movement out of the blue color band; and
   a timer which delays the response to flame radiation in the relatively low frequency band for a predetermined time after ignition of the flame.

9. A flame monitor for a flame of a burner having a fuel supply thereto, comprising:
   a photosensor which detects radiation from a flame and whose sensitivity to wavelength increases from ultraviolet to infrared; and
   an evaluation circuit which is connected to receive input from the photosensor for switching off a fuel supply when (i) there is radiation in the band from 200 to 500 nm or (ii) there is an increase in the detected radiation intensity above 500 nm which indicates movement out of the blue color band;
   wherein the evaluation circuit comprises a first channel for signal components at a relatively high frequency, which represent signal components from ultraviolet radiation up to 500 nm, and a second channel for signal components at a relatively low frequency, which represent visible and infrared radiation, in which case the output signal from the first channel, which enables the fuel supply, can be inhibited by an output signal, whose magnitude can be predetermined, on the second channel.

10. The flame monitor as claimed in claim 9, having a common preamplifier for both channels.

11. The flame monitor as claimed in claim 10, having a signal transmitter which uses the output signal from the second channel to indicate an interruption in the fuel supply.

12. The flame monitor as claimed in claim 10, having a signal transmitter which uses the output signal from the second channel to indicate an interruption in the fuel supply.

13. The flame monitor as claimed in claim 9, having a timer which delays response to flame radiation in the relatively low frequency band for a predetermined time after ignition of the flame.

* * * * *